(12) United States Patent
Suzuki et al.

(10) Patent No.: US 7,259,539 B2
(45) Date of Patent: Aug. 21, 2007

(54) METHOD AND APPARATUS FOR CHARGING A RECHARGEABLE BATTERY

(75) Inventors: Fumio Suzuki, Tokyo (JP); Kiichi Takase, Tokyo (JP)

(73) Assignee: Zip Charge Corporation, Tokyo (JP)

( * ) Notice: Subject to any disclaimer, the term of this patent is extended or adjusted under 35 U.S.C. 154(b) by 1091 days.

(21) Appl. No.: 09/833,884

(22) Filed: Apr. 12, 2001

(65) Prior Publication Data

US 2001/0045813 A1 Nov. 29, 2001

(30) Foreign Application Priority Data

Apr. 14, 2000 (JP) ............................. 2000-113669

(51) Int. Cl.
*H01M 10/46* (2006.01)
(52) U.S. Cl. ..................................... 320/110
(58) Field of Classification Search ................ 320/110, 320/113, 114, 115, 112, 107, 106, 132, 134
See application file for complete search history.

(56) References Cited

U.S. PATENT DOCUMENTS

| | | | | |
|---|---|---|---|---|
| 5,313,642 A | | 5/1994 | Seigel | 713/323 |
| 5,375,051 A | | 12/1994 | Decker et al. | 363/49 |
| 5,592,528 A | * | 1/1997 | Nelson et al. | 379/21 |
| 5,818,197 A | * | 10/1998 | Miller et al. | 320/107 |
| 5,822,427 A | * | 10/1998 | Braitberg et al. | 379/454 |
| 5,834,922 A | | 11/1998 | Ikawa et al. | 320/136 |
| 5,870,615 A | | 2/1999 | Bar-On et al. | 713/310 |
| 5,920,177 A | | 7/1999 | Davis | 320/114 |
| 5,982,147 A | * | 11/1999 | Anderson | 320/132 |
| 6,018,228 A | * | 1/2000 | Dias et al. | 320/106 |
| 6,078,871 A | * | 6/2000 | Anderson | 702/63 |
| 6,211,649 B1 | * | 4/2001 | Matsuda | 320/115 |
| 6,218,806 B1 | * | 4/2001 | Brotto et al. | 320/106 |
| 6,249,607 B1 | * | 6/2001 | Murakawa | 282/199 |
| 6,465,984 B2 | * | 10/2002 | Fukuoka et al. | 320/112 |
| 6,501,949 B1 | * | 12/2002 | Singleton | 455/422.1 |
| 6,531,845 B2 | * | 3/2003 | Kerai et al. | 320/107 |
| 6,532,482 B1 | * | 3/2003 | Toyosato | 708/131 |
| 6,542,092 B1 | * | 4/2003 | Pan | 341/26 |
| 6,850,282 B1 | * | 2/2005 | Makino et al. | 348/371 |

FOREIGN PATENT DOCUMENTS

| | | |
|---|---|---|
| DE | 200 04 691 U1 | 8/2000 |
| EP | 0 435 317 A2 | 7/1991 |
| EP | 0 887 991 A2 | 12/1998 |
| EP | 0 889 659 A2 | 1/1999 |
| EP | 0 889 659 A3 | 1/2000 |
| EP | 1 085 400 A2 | 3/2001 |
| GB | 2 362 520 A | 11/2001 |
| JP | 6-30528 | 2/1994 |
| JP | 10201127 | 7/1998 |
| JP | 10-512378 | 11/1998 |
| JP | 11023678 A * | 1/1999 |
| JP | 20000 20175 | 1/2000 |
| JP | 20000 20176 | 1/2000 |
| WO | WO96/21900 | 7/1996 |
| WO | WO 00/19364 | 4/2000 |

* cited by examiner

*Primary Examiner*—Edward H. Tso
(74) *Attorney, Agent, or Firm*—Neal L. Slifkin; Robert C. Brown

(57) ABSTRACT

In a secondary cell charging apparatus and secondary cell charging method, an internal power supply circuit of a personal computer is used as a power supply for performing a charging operation on a secondary cell. The personal computer uses a charging processing operation program and displays information relating to the charging operation.

25 Claims, 12 Drawing Sheets

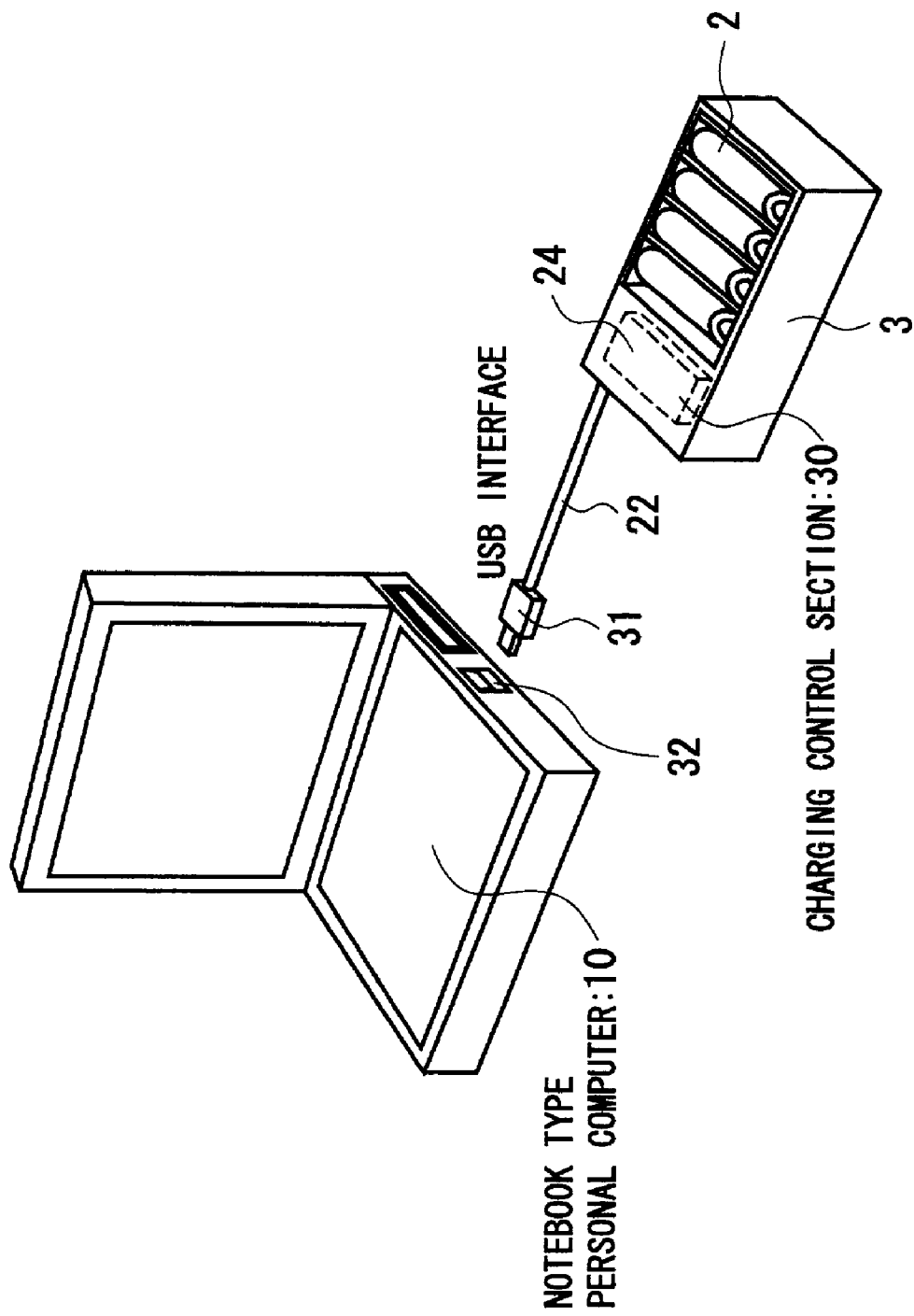

METHOD AND APPARATUS FOR CHARGING A RECHARGEABLE BATTERY

BACKGROUND OF THE INVENTION

1. Field of the Invention

The present invention relates to a charging apparatus and a charging method, and more specifically to a novel, next-generation charging apparatus and charging method for secondary cells requiring charging.

2. Description of the Related Art

In recent years, there has arisen an urgent need for the development of a charging apparatus or charging method for efficiently executing charging processing of a secondary cell.

More specifically, while at present a huge number of secondary cells are used in a wide range of fields, because there is no simple, efficient charging apparatus or method available, secondary cells which can still be charged are treated as if they are secondary cells that cannot be charged, there being an increasingly large number of such secondary unutilized secondary cells to be found in homes, resulting in not only worsening environmental problems, but also a great amount of waste and increase in cost.

In the past, equipment manufacturers made products that could not be used unless the secondary cells therein were charged by a charger, designing equipment that encompassed the characteristics of the secondary cell to be used, thereby forcing consumers to purchase a charger as part of the product.

For this reason, consumers themselves unconsciously came to think of the charger as being part of the product, so that even if better batteries or chargers were to be available on the market, there was absolutely no effort made to correct the mistaken impression of consumers that these would be an added expenses, and that only the batteries and charger provided by the manufacturer could be considered proper components that could enable them to avail themselves of the maximum performance, so that in the extreme cases batteries and chargers were considered inviolable holy cows, with all second-source batteries and chargers considered inferior by comparison, these concepts controlling the minds of consumers.

The only exception to the above-noted situation is that which occurs when a single primary cell of a toy, a flashlight or a TV terminal or the like becomes depleted, in which case the users gets by with another battery purchased at a supermarket or appliance store.

The most common typical example of the current situation is that of cellular telephones, the reason for this being that sealed battery covers of the slide-in type are common in the field of secondary cells, the secondary cell being housed therewithin. It is not even possible for the consumer to open the sealed secondary cell cover, and even if a second source battery maker were to manufacture a good secondary cell, it would be nearly impossible to accommodate hundreds of different types of cellular telephone covers, not to mention the fact that cellular telephone manufacturers continue to introduce new models to the market every three months, making it impossible to keep up with manufacturing of secondary cell covers to accommodate the constantly appearing new models of cellular telephones.

Large-capacity electrical tools also fall into this category.

Given the above-described situation, nickel-hydrogen secondary cells that should be able to tolerate more 1000 charges and nicad batteries that should be able to tolerate over 1500 charges are no longer able to hold their capacity after just 200 or 300 charges, thereby forcing consumers to replace relatively high-cost pack batteries prematurely.

The main reason for this is that the a charging method developed more than 40 years ago, this being the negative delta V method, in which overcharging, which is the most severe treatment of secondary cells, inevitably occurs is used in the chargers provided by all manufacturers. The resulting overcharging causes a breakdown of the chemical function with in the secondary cell, so that at 200 to 300 charges the consumer is forced to spend a high amount of money to replace the secondary cell.

In a negative delta V charging system of the past, nicad and particularly nickel-hydrogen charging requires as long a time as 2 hour and 30 minutes, and even after this charging discharging tests on nickel-hydrogen batteries of typical Japanese manufacturers reveals no more than 60% or 75% charge ratio, and it is not possible to expect 100% charge ratio.

In particular in the case in which there is, for example, 25% of capacity remaining in a battery, the ideal method for increasing the charging ratio is to achieve a 100% discharge, so as to bring the battery to the 0% charge level, and then perform charging. Unless this is done, it is almost impossible with negative delta V charging to raise the charge of the battery from the residual charge of 25%, that is to raise the charge level from 26% to 100%. This being the case, if the discharging time is 1 hour, a charging time of 3 hours is necessary, this representing a considerable disadvantage to a user wishing to quickly charge the battery.

The above situation is caused by the "memory effect," which is a characteristic of nicad and nickel-hydrogen batteries.

In the case of an electric drill, of course, unless the battery can be charged completely in approximately 10 minutes, it would be necessary for an electrical worker to carry five or six electric drills with fully charged batteries. Recently, however, if slight battery damage is allowed, rechargeable electric drills with a charging rate of 6 C (10 minutes) have become available. These products, however, make a high-cost switching regulator type power supply in order to source a high current at one time an essential part, so that such electric drills that can be charged in 10 minutes must be priced at approximately 40,000 yen or higher for retail sale.

Because of overheating of the secondary cells that are used, replacement is necessary after approximately 100 charges.

What is most required when performing charging is a charging method that is suited to the characteristics of the battery or battery pack at the time of charging.

This is easy to express in words, but in reality (1) the characteristics and internal resistances of batteries of various battery manufacturers are mutually different, (2) there are differences in charging characteristics of batteries of even the same manufacturer, (3) if a battery or battery pack is left unused for a long period of time, in the case of an absolutely new battery there are a great many cases in which the battery is almost entirely unactivated (unformed), and such batteries must be activated when being charged, and (4) in particular in the case of a battery pack formed by 4 or 6 single cells connected in series, if just one of the cells is unformed or faulty, it is almost impossible to achieve the desired battery capacity.

A charging method for a secondary cell that reliably solves the numerous above-noted problems is a pre-requisite as a next-generation secondary cell charging method.

The present invention is directed not only at educating consumers with regard to the various above-described problems, but also at removing the above-noted problems by operating a PC, a device which is highly accessible to today's consumers, thereby providing an ideal method of charging, thereby providing consumers with a significant social advance.

Accordingly, it is an object of the present invention, to improve on the above-noted drawbacks in the prior art, to provide a charging apparatus and a charging method capable of reliably achieving full charging of a prescribed secondary cell in a short period of time and using a simple apparatus. It is a further object of the present invention to provide a charging apparatus and charging method which, by extending the life of a secondary cell, can solve both environmental and resource problems, and which can execute charging processing of a secondary cell, making easy use of a home-use PC(PC) in an interactive manner.

SUMMARY OF THE INVENTION

To achieve the above-noted objects, the present invention adopts the following base technical constitution.

Specifically, a first aspect of the present invention is a secondary cell charging apparatus which uses a computer apparatus as a part of construction elements of the charging apparatus and more specifically, the charging apparatus of the present invention is formed by a charger for a secondary cell using an internal power supply circuit of a computer apparatus (hereinafter referred to as a PC. or PC) as the power supply required for a charging operation.

More specifically, this charger is either a charging processing program required for a charging operation on a secondary cell, per se, or is a charging apparatus formed by a charger with a charging processing program required for a charging operation on a secondary cell built therein.

A second aspect of the present invention is a charging system formed by a PC having an internal power supply circuit, a charger having built into it a charging processing operation program using the internal power supply circuit of the PC as the power supply in the charging operation, a display means connected the PC, a input means connected to the PC, a controller for driving the PC, and an internal power supply means for driving the PC, wherein the above-noted charger is directly or indirectly connected to a battery holder, the battery holder having a holder part configured so as to accept and enable a charging processing operation on one or a plurality of secondary cell of various sizes separately that require charging processing, or a stand part that enables direct insertion of either a battery package into which a plurality of secondary cells of the same size that require charging processing are packed into a prescribed pack or a cellular telephone with a built-in battery package.

In this embodiment of the present invention, the charging system can be configured so that the above-noted charging processing operation program can either be built into the PC by inserting a floppy disk, a CD-ROM, or an IC card into which the charging processing program has been stored into a prescribed location in the PC so as to built the charging program into the PC, or by inserting an expansion board having an IC chip that includes this charging processing operation program into an expansion slot of the PC so as to build the charger into the PC.

A third aspect of the present invention is a secondary cell charging method for a charger to which is connected to a holder part configured so as to accept and enable a charging processing operation on one or a plurality of secondary cell of various sizes separately that require charging processing, or a stand part that enables direct insertion of either a battery package into which a plurality of secondary cells of the same size that require charging processing are packed into a prescribed pack or a cellular telephone or the like with a built-in battery package, this charger being internally or externally connected to a PC, and the internal power supply circuit of the PC being connected to the charger for use as a power supply for a charging operation. More specifically, this is a method for charging a secondary cell, whereby a charger provided either internal within or external to a PCIs connected to the internal power supply circuit of the PC as well as is connected to a battery holding means which holds a secondary cell requiring charging processing being connected directly or via an appropriate connector or cable to an appropriate signal output terminal, and this charger having built into it a charging processing operation program for the purpose of charging the secondary cell.

By adopting the above-described technical constitution, a charging apparatus, charging method, and charging system according to the present invention not only provide a charging apparatus and charging method capable of reliably fully charging a secondary cell quickly with a simple apparatus, but also provide a charging apparatus and charging method which, by extending the life of a secondary cell, solve both environmental and resource problems, while enabling each charging processing of a secondary cell using a home-use PC in an easy-to-use interactive manner.

That is, a charging apparatus and charging method according to the present invention have a configuration that is completely different from the idea of a charging apparatus of the past, and can rightfully be characterized as a secondary cell charging apparatus and secondary cell charging method that will serve as the next-generation charging apparatus and next-generation charging method.

More specifically, a next-generation charging apparatus according to the present invention, using a PC, which can now be found in any business or home, regardless of whether it is a desktop PC, a laptop PC, or even a smaller mobile PC, and regardless of the operating system type, be it DOS/V or Macintosh or the like, enables use of the PCI (PC interface) built thereinto, which is a de facto worldwide standard, to use an interface that is variously called a PCI board or a PCI card, or an expansion board inserted into a PC expansion slot as a charger, thereby using the PC as a platform thereof.

A circuit board on a part of a card or an expansion board, for example, at a center thereof, provided with a chip having within it the above-noted charging processing operation program is assembled and inserted into the PC, and the calculation functions of the PC are utilized to drive the charging processing operation program, so as to execute the prescribed charging processing operation on a secondary cell requiring prescribed charging.

Thus, the charger of the present invention is formed by using the internal power supply circuit of the PC as the power supply required for a charging operation on a secondary cell, and the PC used can be selected as a general-purpose PC, a dedicated game PC, or a television PC having a TV receiver with bi-directional communications capability or the like.

Additionally, the charger used in the present invention can be either a charging processing operation program per se, required for a charging operation on a secondary cell, or an apparatus with such a charging processing operation program required for charging of a secondary cell built thereinto, this charger being provided either within or external to the PC, and having a battery holder with either a holder portion or a stand portion for holding a secondary cell requiring charging processing.

In the present invention, it is preferable that the battery holder can be formed with a size thereof as being large as possible so that various number of the secondary cell batteries to be charged, can be inserted thereinto, as possible.

The apparatus that forms the charger according to the present invention is desirably selected from a group of an International standard of PCI (PC interface) comprising a PCI board or PCI card, an IC chip installed on an expansion board, a CD-ROM, a floppy disk, or an IC card onto which has been stored the charging processing operation program, or a hard disk of the PC(HD), onto which the charging processing operation program has been installed.

As shown in FIG. 4 of the accompanying drawings, which will be described below, charging can be done in the case of SUM-3 (ANSI type AA cells) which share more than 70% of the world market thereof a battery holder 41 for the SUM-3 battery is connected to an expansion board 42, onto which is mounted a chip 43 into which is stored the above-noted charging processing operation program and making connection to a charger according to the present invention. In the case of a cellular telephone or the like, as shown in FIG. 5, charging can be done without any regard to the battery pack that is attached to the cellular phone by sliding, by the consumer inserting the cellular telephone into a stand part 6 that is configured so as to charge the secondary cell for the cellular telephone that is always provided as a part when the consumer purchases a cellular telephone, this being then connected the charger of the present invention.

According to this method, regardless of the type of cellular telephone or how the battery pack changes in the future, it is possible without interrupting calling (the telephone being in the condition in which it can receive a call) to perform quick charging using the VR charging method for secondary cells indicated already by the inventors of the present invention in Japanese Patent No. 2739133, Japanese Patent No. 2732204, or Japanese Patent No. 2743155.

The second major feature of the present invention, as shown in FIG. 6, is the use of the power supply of the PC in place of a switching regulator for the purpose of causing a large amount of current to flow when performing charging at a rate, for example, of 6 C (for 10 minutes).

In the present invention, a conventional charging processing method such as so called minus-delta V or the like also can be used, instead.

By adopting the above-described constitution, the cost of the switching regular and the like, which is the largest cost involved in manufacturing a charger is eliminated, thereby enabling a great cost reduction.

Furthermore, because the PC used in the present invention generally has a power supply with a power capacity of 250 to 450 watts, even if the above-noted high-speed charging method is used, it is fully possible to perform 4 C or 6 C high-speed charging processing.

It is possible on the display means (display) of the PC used in the present invention to view directly all the charging characteristics of batteries made by the manufacturer of the battery the consumer is about to charge, and more particularly it is possible to view an index (database) of the type (nicad, NiMh), the battery characteristics (rapid type, whether or not the battery is intended for high-speed charging), and the ideal charging time (6 C, 4 C, 3 C, or 1 C (1 hour)) and the like for all the secondary cells marketed worldwide.

At the point at which the consumer recognizes the characteristics of the battery to charge, these are clicked on the PC and data is input to on the screen, after which a start location is selected to start charging by the new "VR" charging method (as established already by patent), after which the voltage gradually increases, the charging curve being observable in real time along the time and voltage axes, the voltage stopping as soon as the charging reaches a peak, enabling observation of the "peak cut" that is characteristics of VR charging, the voltage curve after transition into trickle charging reaching completion, and the user being notified of this event by the sounding of a loud alarm.

Note that, in the present invention, by operating the control condition inputting means consisting either a key board or a mouse of the PC, at lease one of information selected from a group of charging processing information, charging processing condition, information of a battery to be charged, situation of charging process proceeding, charging history or the like is selected so as to make a control based upon the selected information and then the result thereof is displayed on the display means of the PC.

And further note that in the present invention, the charging process operation program may be created individually based upon the type of battery, model thereof or application thereof or the like, respectively.

It is naturally possible to enter the data of the charging and the charging number and the like using a keyboard, to print out the charging curve as a history of the charged battery or battery pack, or to keep this information on hard disk, so as to enable saving of all battery data, thereby enabling use as reference data when performing the next charging.

While it is possible to purchase the charger as the software stored on one or two floppy disks as shown in FIG. 7, it also possible to view all instructions and charging curves, in the form illustrated in FIG. 8, via the Internet.

In the present invention, the user can purchase a complete set, providing a kit for the above-noted next-generation charger, this set including the items listed below, from an appliance store, a supermarket, or a convenience store.

(1) A PCI board, PCI card, or expansion board or the like onto which is installed the charger, for insertion into a PCI slot
(2) A battery case for four type AA cells, and an adapter for insertion of a charging terminal for a cellular telephone
(3) Floppy disk for a PC (with software)
(4) Required connection and interface cables and the like
(5) Manual describing the procedure for the charging method and charging conditions and the like
(6) Secondary cells that are most suited for the charging method recommended for the charging processing operation program (for example, several ANSI type AA cells)

Additionally, in the present invention, it is possible by disclosures made via the Internet at an interval of, for example 3 months, to provide for use by the consumer a revised index that reflects, with regard to secondary cells, information with regard to new types of cells that are constantly being introduced by the world's manufacturers, including removal of information with regard to discontinued types.

In the present invention, it is possible at any time to download the latest charging control software from the Internet, via a prescribed billing system, and to order the above-noted complete kit or a part thereof via the Internet in the same manner, thereby making use of e-commerce.

BRIEF DESCRIPTION OF THE DRAWINGS

FIG. 12 is a drawing showing another embodiment of a charging apparatus for the case in which a USB terminal of the PC is used for the charging process of the present invention

DETAILED DESCRIPTION OF THE PREFERRED EMBODIMENTS

Embodiments of a charging method and a charging apparatus according to the present invention are described in detail below, with references made to relevant accompanying drawings.

Figure 1:
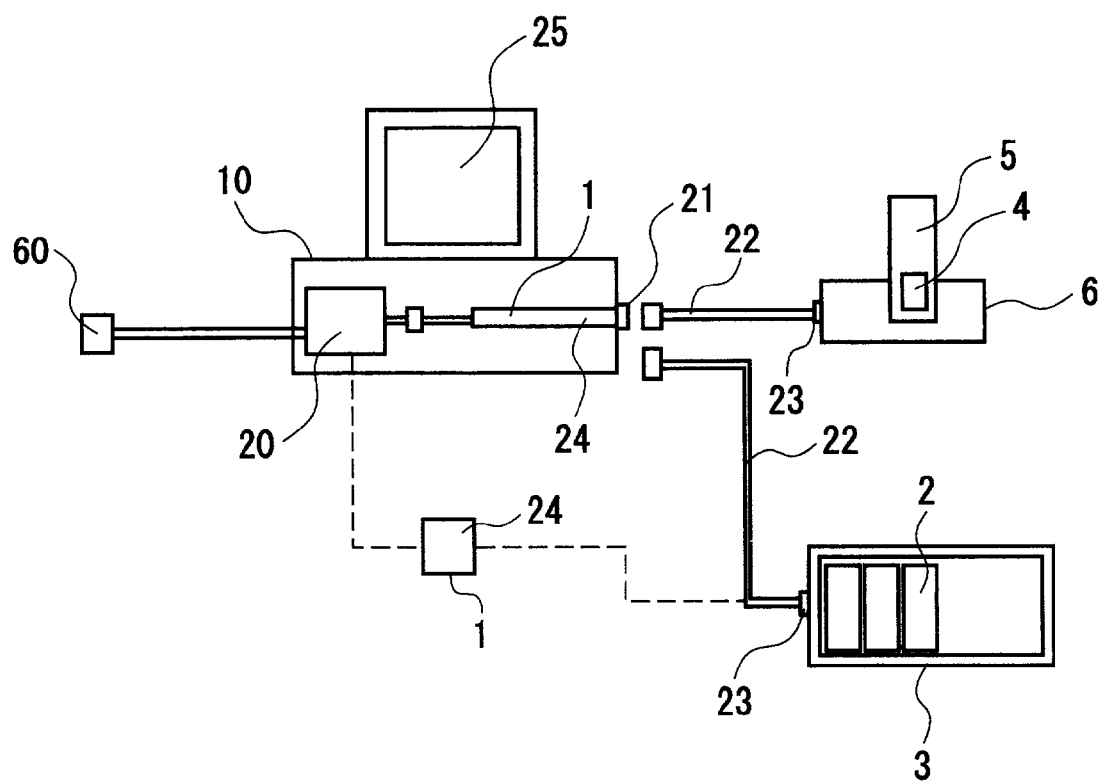
FIG. 1 is a block diagram showing the general configuration of a charging apparatus according to the present invention.

Specifically, FIG. 1 is a drawing illustrating the general configuration of an example of a charging apparatus according to the present invention, this drawing showing a charging apparatus 100 wherein the internal power supply circuit 20 of a computer apparatus (PC) 10 is used as the power supply of a charger 1 required for a charging operation on a secondary cell.

The PC in the present invention is desirably selected as a general-purpose PC, a dedicated game PC, or a TV PC having a TV with bi-directional communications capability.

This PC can be a desktop type PC, a laptop PC, and even a smaller portable or mobile PC.

Additionally, the charger 1 used in the present invention can be a charging processing operation program 24 itself, which is required for a charging operation on secondary cells 2 and a packed secondary cells 4, and can alternatively be selected as one apparatus into which is built the charging processing operation program required to charge secondary cells 2 and 4, for example, selected as one of either an international standard PCI (PC interface) selected from either PCI board or PCI card, an IC chip 43 installed onto an expansion board 42 or the like, a CD-ROM, a floppy disk 48, an IC card into which is stored the charging processing operation program, or a hard disk of a PC into which the charging processing operation program has been installed.

The charger 1 of the present invention can be provided within the PC 10 and can alternatively be provided external to the PC.

Additionally, in the present invention battery holders 3 and 6, which hold a secondary cell requiring charging processing, must be connected to the charger 1.

That is, in the charging apparatus 100 according to the present invention, the charger 1 is connected to the internal power supply circuit 20 of the PC 10, and also to the battery holders 3 and 6, either directly or via an appropriate connector and/or a cable 22.

In the charging apparatus 100 of the present invention, in the case in which the charger 1 is provided within the PC 10, the charger 1 is preferably connected to the internal power supply circuit 20 of the PC 10, and is connected to the battery holders 3 and 6, either directly or via an appropriate connector and/or cable 22, via a signal output connector 21 of the PC 10.

As the battery holder in the present invention, it is possible to use a holder part 3, which accepts individually and enables charging of one or a plurality of secondary cells of various sizes requiring charging processing, and alternatively possible to use as the battery holder stand part 6, which enables direct insertion of either a battery package into which a plurality of secondary cells of the same size that require charging processing are packed into a prescribed pack or a cellular telephone with a built-in battery package.

The secondary cell holder part 3 or stand part 6 preferably is formed so as to be matched to the size and shape of each of the secondary cells 2 and 4.

The battery holding means 3 and 6 of the present invention are provided with a terminal part 23 for connection to the connector and/or cable 22.

Additionally, the secondary cell holder part 3 or stand part 6 in the present invention is desirably configured so as to be suitable for all the dimensions and shapes of each of the secondary cells 2.

The charger 1 connected to the internal power supply circuit 20 of the PC 10 of the present invention has built within it a charging processing operation program required for charging of the secondary cell 2, and it is desirable that this secondary cell charging processing operation program execute high-speed charging processing.

Additionally, it is desirable that the high-speed charging processing in the present invention execute charging processing at a charging rate of at least 2 C, for example, using the VR charging method for secondary cells proposed already by the inventors of the present invention in Japanese Patent No. 2739133, Japanese Patent No. 2732204, or Japanese Patent No. 2743155.

Figure 4:
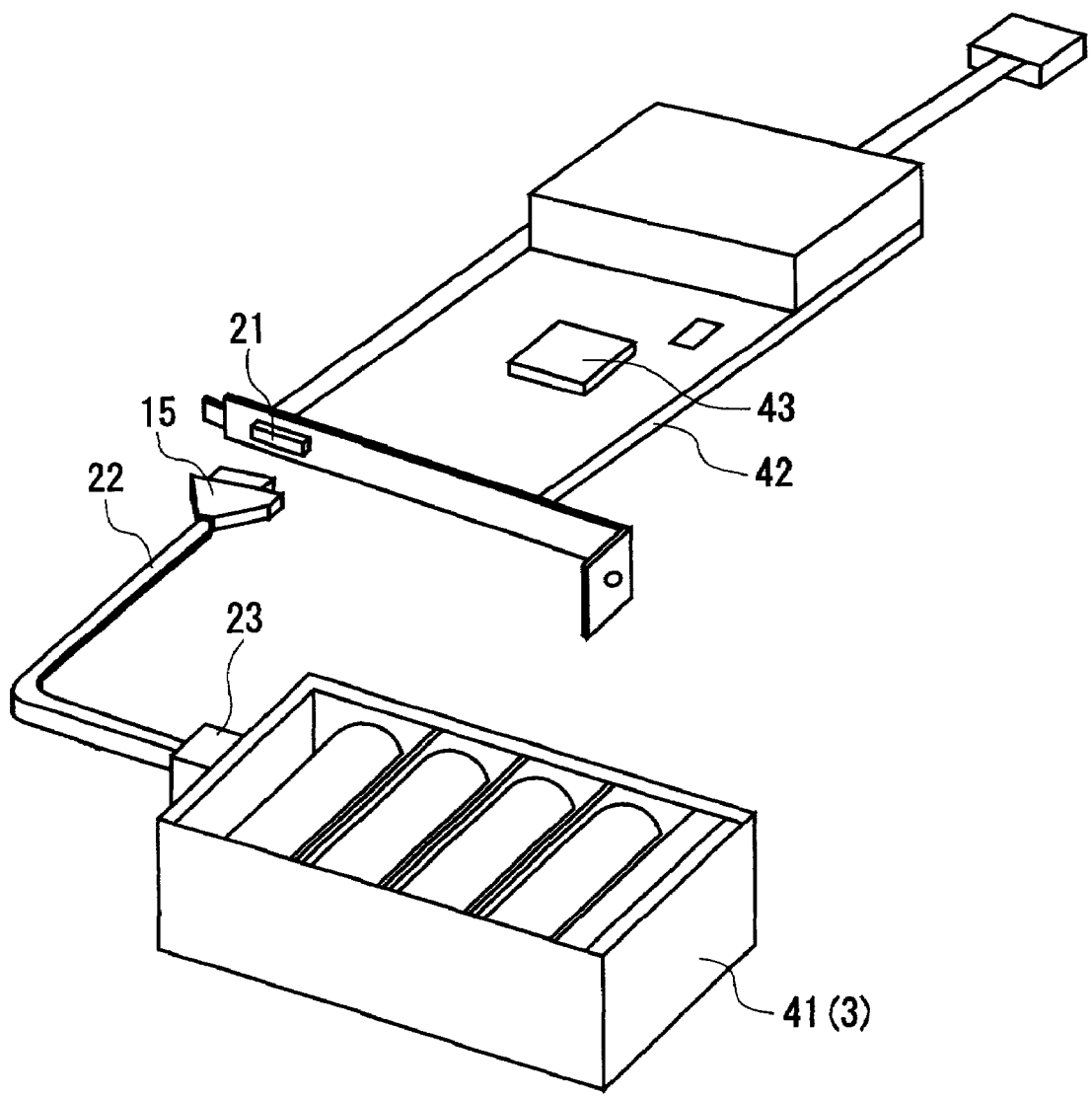
FIG. 4 is a drawing showing an example the storage structure of a charging processing operation program using an expansion board, and an example of the configuration of a charger formed by a holder part connected to this expansion board, according to the present invention.
Figure 5:
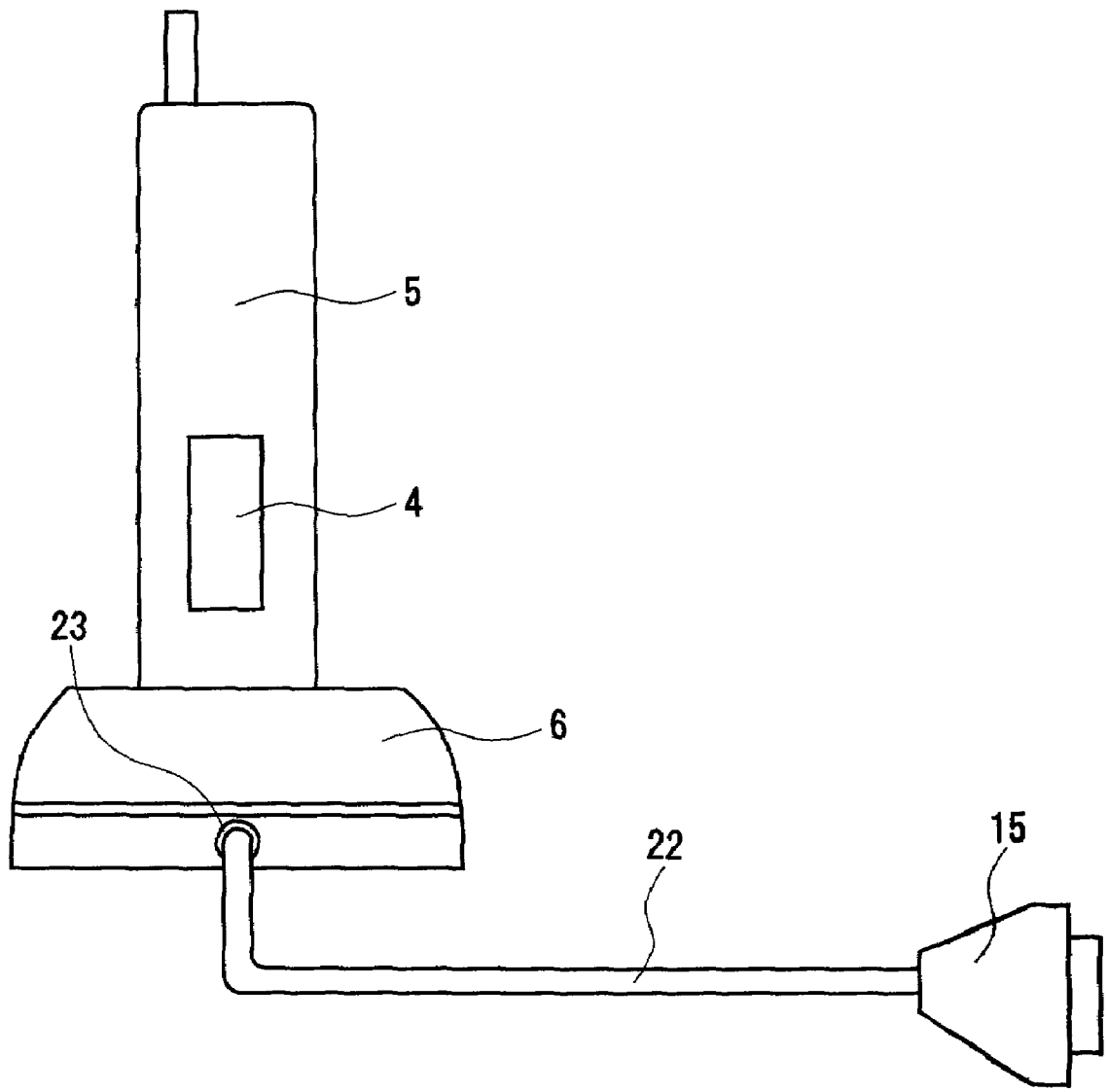
FIG. 5 is a drawing showing an example of the configuration of a stand part used for charging a device such as a cellular telephone, which includes a secondary cell, according to the present invention.
Figure 6:
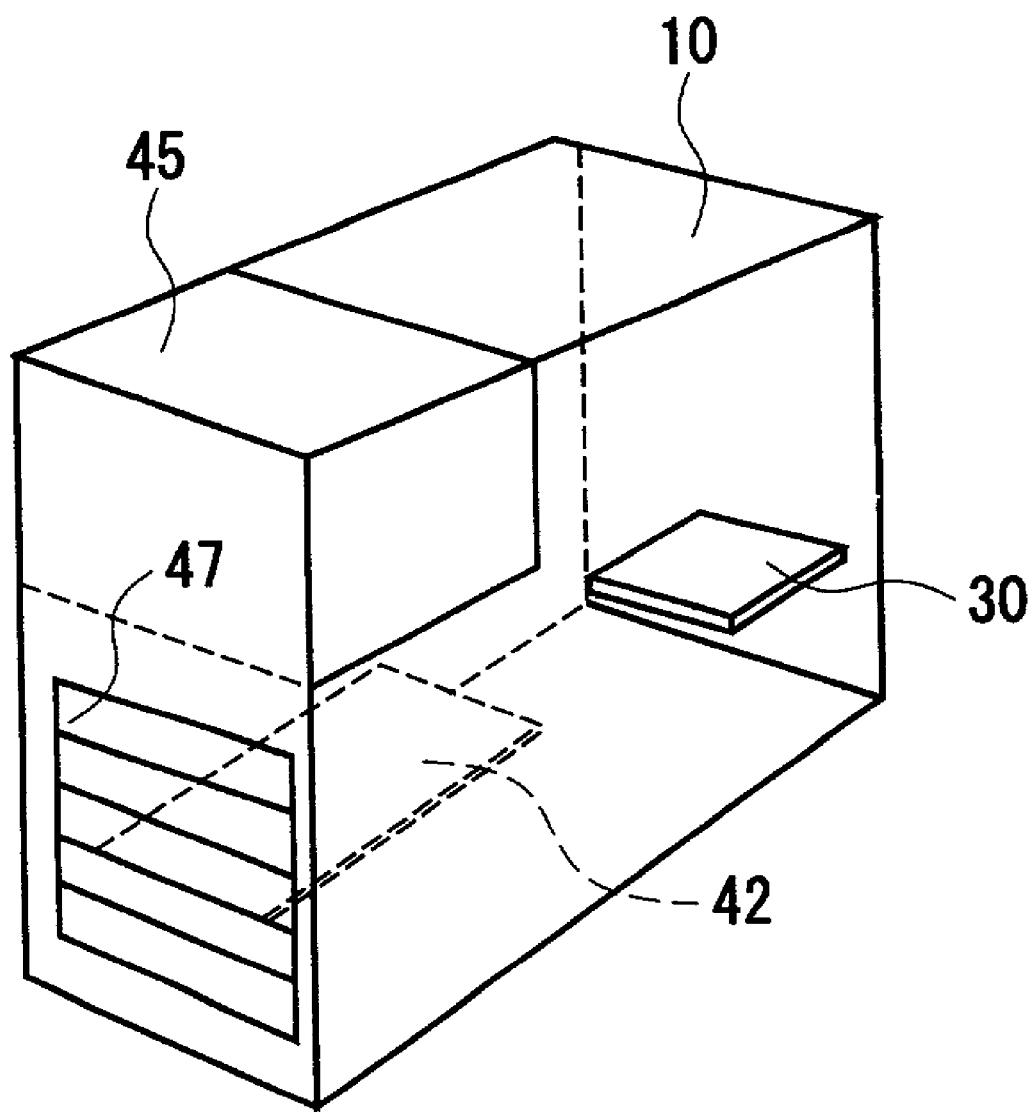
FIG. 6 is a drawing showing the relationship between the PC processor part, the expansion slot part, and the internal power supply used in the present invention.
Figure 7:
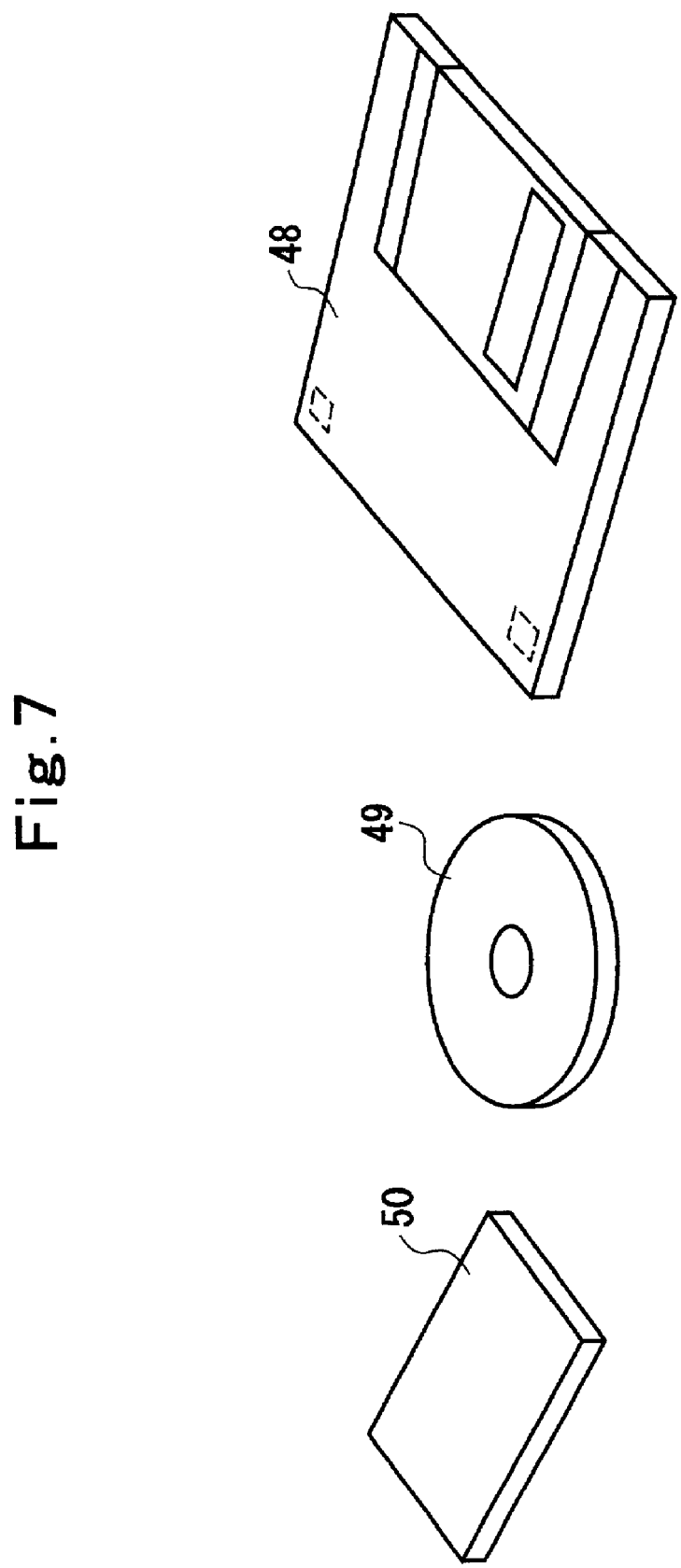
FIG. 7 is a drawing showing configuration examples of the configurations of a floppy disk, a CD-ROM, and an IC card into which is stored a charging processing operation program used in the present invention.

In the present invention, as shown in FIG. 7, the charging processing operation program can be built into the PC 10 either by inserting a floppy disk, a CD-ROM 49, or an IC card 50 onto which the charging processing program has been stored into a prescribed location 30 in the PC 10, or as shown in FIG. 4, by inserting an expansion board a PCI board or PCI card 42 or the like, each having an IC chip 43, that includes this charging processing operation program into an expansion slot 47 of the PC 10 as shown in FIG. 6.

The charging processing operation program of the present invention must be provided with mutually different charging processing operation conditions for each factor, such as the manufacturer, type of secondary cell, model, construction, quantity, battery capacity, and internal resistance of each of the secondary cells 2 and 4 to receive charging, and it is preferable that this charging processing operation program have a function that distinguishes at least part of the factors such as manufacturer name, secondary cell type, model, construction, quantity, battery capacity, and internal resistance of the secondary cells 2 and 4 requiring charging processing inserted in the holder part 3 or the stand part 6.

In the present invention, it is also desirable that the display means 25 of the PC 10 display information with regard to the secondary cells 2 and 4 requiring charging processing inserted in the holder part 3 or the stand part 6.

Figure 2:
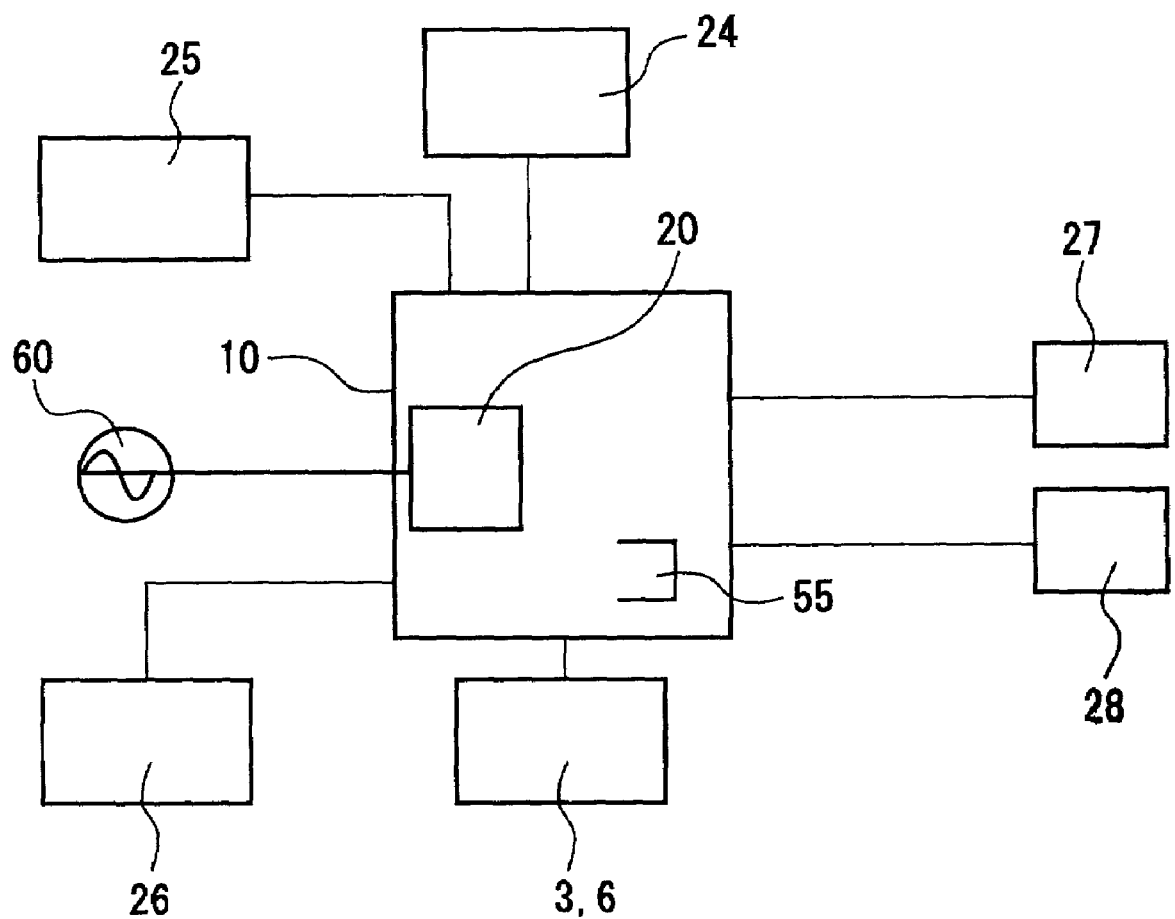
FIG. 2 is a block diagram showing an example of the detailed configuration of a charging apparatus according to the present invention.

In the present invention, as shown in FIG. 2, it is further possible to adopt a configuration in which a user can use an appropriate input means 26 associated with the PC 10, for example, a mouse or a keyboard, to input information with regard to the secondary cells 2 and 4 requiring charging processing inserted in the holder part 3 or the stand part 6, causing it this information to be displayed on the display means 25 of the PC.

In the present invention, it is further possible to adopt a configuration in which when the user uses an appropriate input means 26 associated with the PC 10 to input information with regard to the secondary cells 2 and 4 requiring charging processing inserted in the holder part 3 or the stand part 6, causing this information to be displayed on the display means 25 of the PC, if at least one information is input that is different from the information of the secondary cell requiring charging processing inserted in the holder part 3 or the stand part 6 is input, an alarm means 27 is driven.

In the present invention, it is possible to adopt a configuration in which the user makes a selection of various conditions required for charging of the secondary cell 2 from information of the secondary cell 2 requiring charging processing from a large number of alternatives displayed on the display means 25 of the PC 10 as part of information with regard to the secondary cell requiring charging processing.

In the present invention, at the PC 10, of information with regard to the secondary cell 2 requiring charging processing as recognized by the PC 10, or of information with regard to the secondary cell 2 requiring charging processing input by the user to the PC 10 via the input means 26, selection is made from a plurality of types of charging processing conditions stored in the charging processing operation program of charging processing conditions most suited to the secondary cell requiring charging processing, these being displayed on the display means 25.

A salient feature of the present invention is that a predicted charging characteristics graph with regard to the charging operation conditions for the selected secondary cell 2 requiring charging processing can be displayed on the display means 25.

Figure 9:
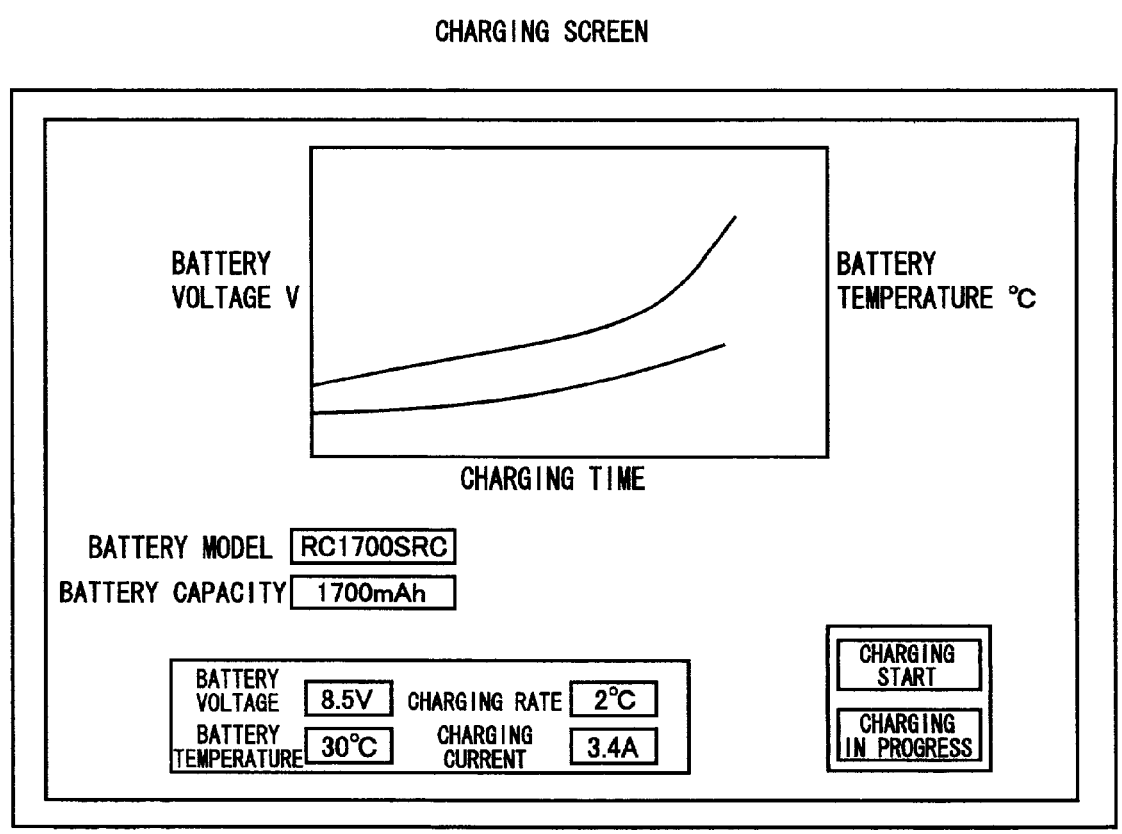
FIG. 9 is a drawing showing an example of the configuration of a display screen before the start of charging of the display means in the present invention.

It is desirable that the above-noted predicted charging characteristics graph, for example as shown in FIG. 9, shows the relationship between the battery current and the charging time or the relationship between the battery temperature and the charging time.

By performing the above-noted display, it is possible for the user to obtain a general understanding of the charging operation, without a deep level of experience or knowledge with regard to battery charging technology.

Figure 8:
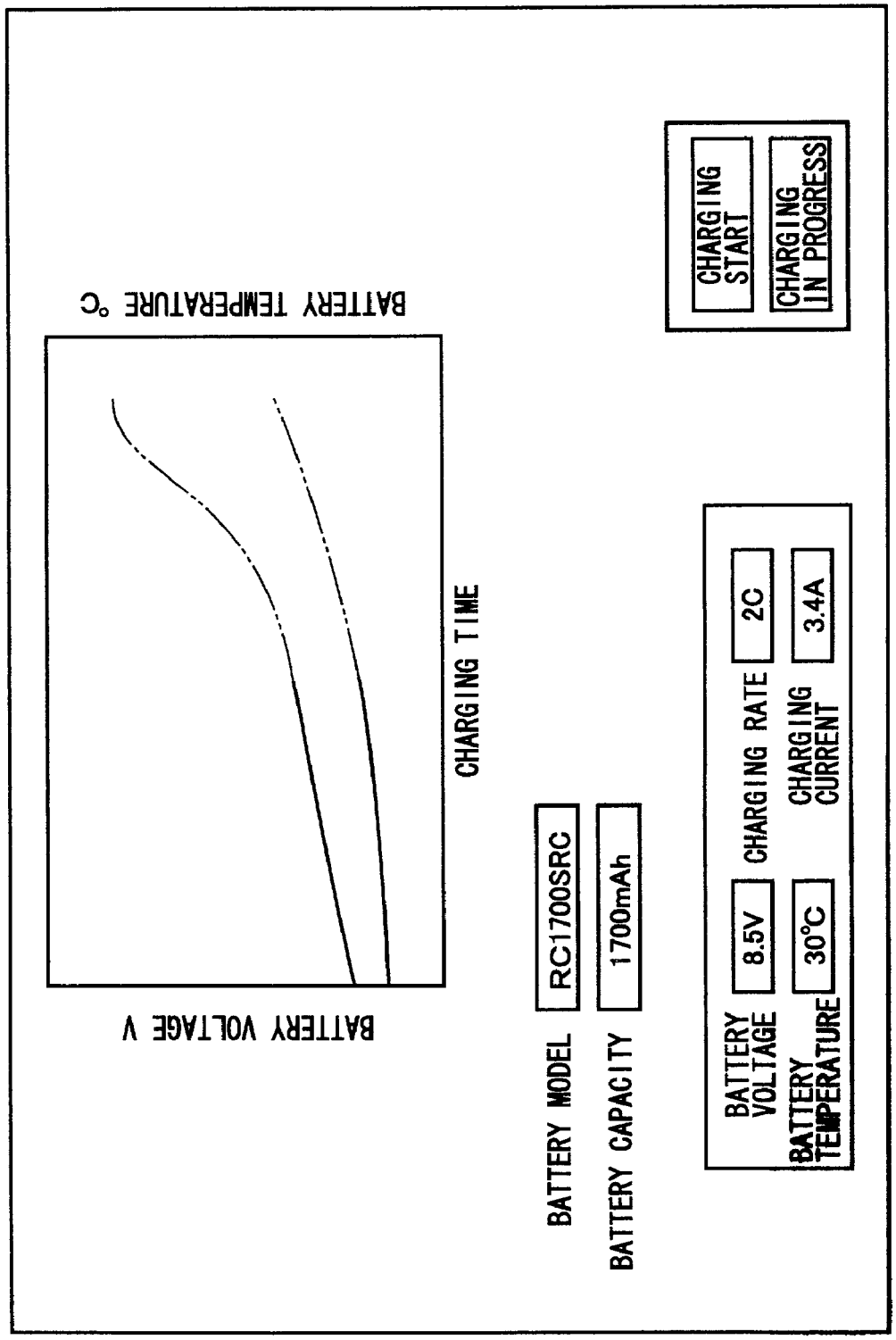
FIG. 8 is a drawing showing a screen displayed on the display means during a charging operation according to the present invention.

Additionally, in the present invention the display means 25 of the PC 10 performs a display with regard to charging operation conditions for a selected secondary cell 2 requiring a charging operation, such as battery model, battery capacity, charging rate, charging power supply, and the like, and a display indicating whether charging is started or in progress, and during the charging operation of the secondary cell the display means 25 can display the battery voltage and battery temperature of the secondary cell, which change with the elapse of charging time, or a graph showing the relationship between the battery voltage and the charging time or the battery temperature and the charging time, so that, as shown in FIG. 8, it is possible to gain a visual understanding of the charging condition curing the charging of a secondary cell, thereby contributing to the improvement of an understanding of the charging processing.

Figure 11:
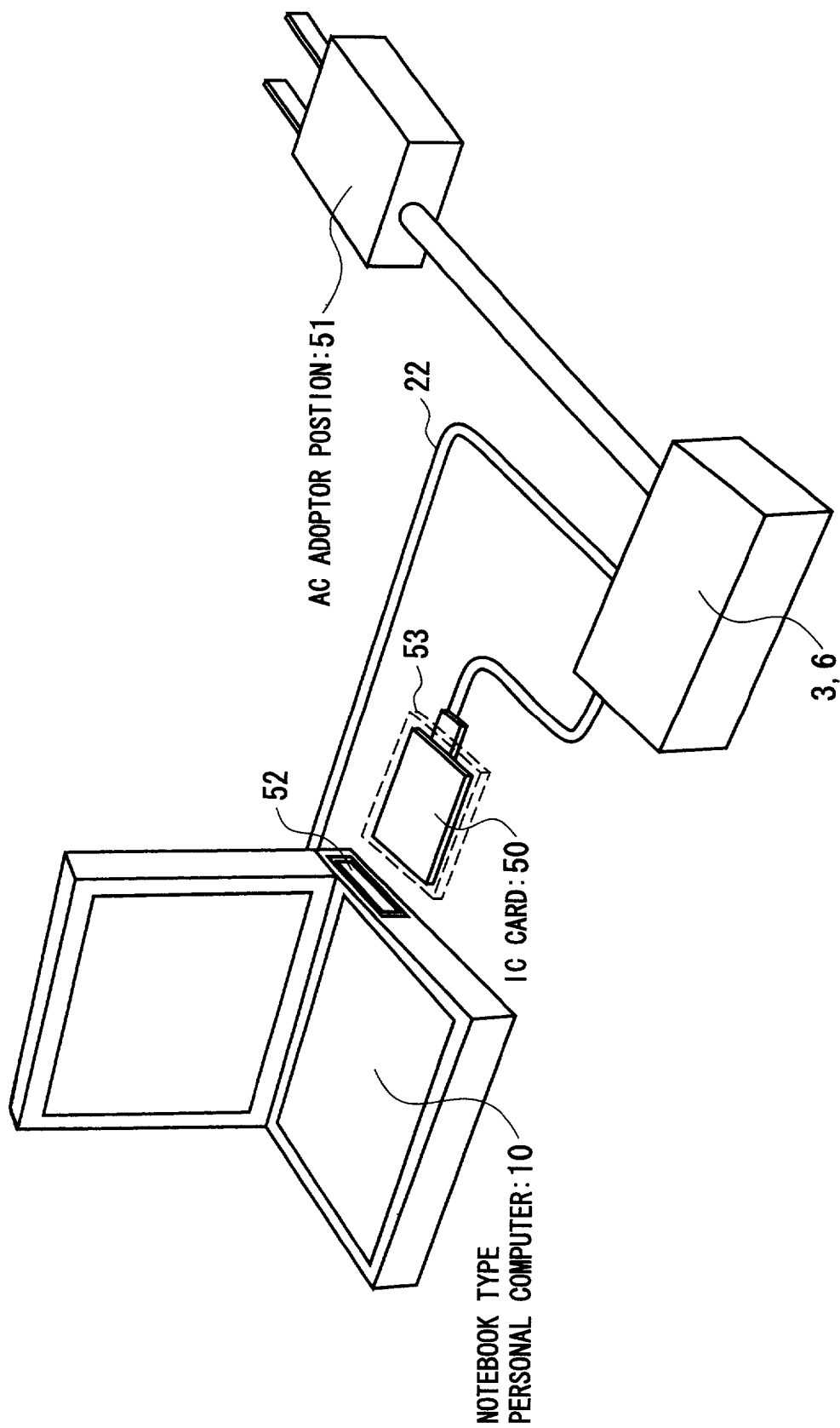
FIG. 11 is a drawing showing an example of a charging apparatus for the case in which a charger according to the present invention is implemented using a portable PC.

In the case in which the PC used in the present invention is a portable PC, it is desirable that, as shown in FIG. 11, a charger 1 formed by an IC card 50 or the like be inserted into a prescribed slot 52 of the portable PC, or be installed into an externally connected apparatus 53, and a connection be made to the internal power supply circuit 20 of the PC, the signal output terminals of the portable PC 10 and the control signal input terminals of the battery holding means 3 or 6 being connected via an appropriate cable 22, and the battery holding means 3 or 6 being connected to an external power supply via an appropriate adaptor 51.

It is desirable to adopt a configuration in the present invention having a notification means 28 which, after a prescribed charging processing operation is started under condition selected for a selected secondary cell 2 requiring charging processing, in the case which the charging operation is completed, notifies the user of this result, and also possible have a configuration in which the notification means 28 has the same configuration as the above-noted alarms means 27.

It is desirable that the charging processing operation program in the present invention have charging processing conditions set separately for all secondary cells 2 currently existing that are to be subjected to charging processing.

That is, because an object of the present invention is to enable anyone, anywhere to easily perform a charging processing operation for any secondary cell 2 used at present anywhere in the world, for each of the secondary cells manufactured and sold by secondary cell manufacturers domestically and overseas, information such as the type, model, rating, capacity, output voltage, charging characteristics, and discharging characteristics and the like are identified, a battery list is generated, and this list is stored in a prescribed database, an ideal charging processing operation program for each of the secondary cells being established, and these programs being stored in the database, with a correspondence established between the programs and each of the secondary cells.

It can be envisioned that the type of secondary cell in the present invention is, for example, lead battery, a nickel-hydrogen battery, a nicad battery, or a lithium ion battery or the like, and the form of the battery in the present invention can be classified in terms of whether it is a single battery or packaged, or whether it is a SUM-1, SUM-2, SUM-3 (ANSI type AA), or SUM-4 form of battery.

In the present invention a suitable charging processing operation program suitable to a new secondary cell type must be created each time a new secondary cell is placed on the market, and it is further necessary to perform updating processing to add this newly created program to existing charging processing operation programs.

Therefore, the provider 90 of the charging processing operation program must at all times continue the task of performing updating of the above-noted database so that it includes the latest information at all times, based on information with regard to newly market secondary cells and discontinued secondary cells.

The information with regard to new secondary cells must be configured so that it is provided to the user at a charge, or at no charge at all times.

That is, in the present invention a floppy disk, a CD-ROM, or an IC card that includes an updated charging processing operation program is distributed to users by a transport means such as a door-to-door delivery service, postal mail, or the like, either at a charge or free of charge, the user being then able to update the charging processing operation program stored in his or her PC with the newly provided charging processing operation program.

An alternative method that can be used is that of the charger 1, that is, the charging processing operation program being distributed to users via a communication system such as the Internet.

In the present invention, in the case in which network distribution is done, a user, in accordance with a priorly established method, pays a fee for the charging processing operation program, after which he or she downloads the charging processing operation program via the Internet, enabling the updating of the charging processing operation program stored in an IC chip, or on a floppy disk of the PC with the downloaded charging processing operation program.

As described above, a charging system according to the present invention is formed by a PC 10 having an internal power supply circuit 20, a charger 1, which includes a charging processing operation program 24 which uses the internal power supply circuit of the PC as a power supply for a charging operation, a display means 25 connected to the PC 10, an input means 26 connected to the PC 10, a controller 55 for driving the PC 10, and an external power supply means 60 for driving the PC 10.

The above-noted charging system of course has all of the above-noted elements.

Figure 3:
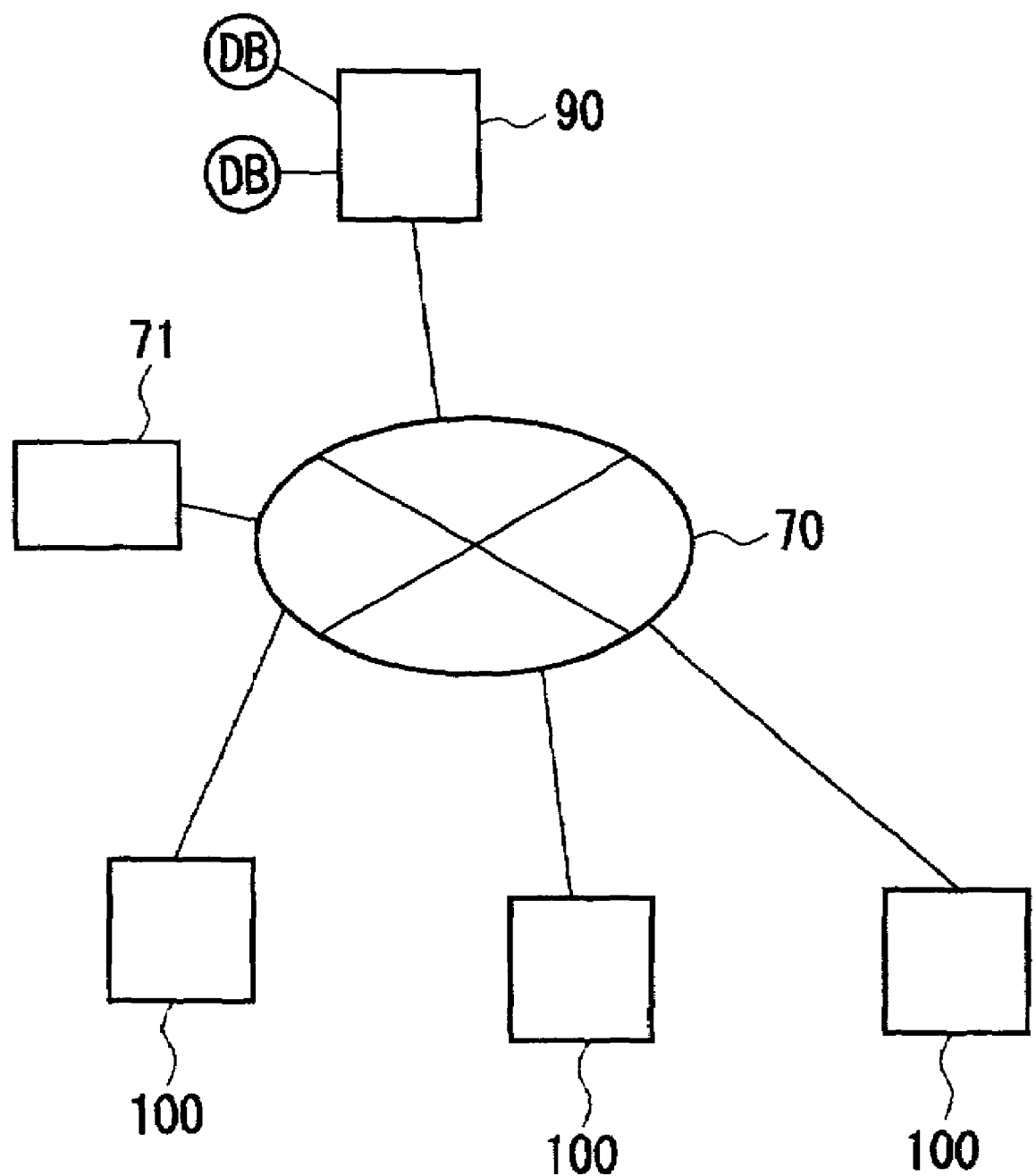
FIG. 3 is a block diagram showing a specific example in which a charging apparatus according to the present invention is connected via the Internet.

FIG. 3 shows an example in which a charging system according to the present invention is implemented via the Internet.

Specifically, in a charging system according to the present invention, the updated charging processing operation program is distributed to a user via a communication system 70, such as the Internet, and the user, in accordance with a priorly established billing means 71, makes a payment of a fee for a new charging processing operation program or a charging processing operation program to be used for updating, after which the charging processing operation program is downloaded via the Internet, enabling the user to update the charging processing operation program stored in the user's PC with the new charging processing operation program.

In the charging apparatus 100 and the charging system according to the present invention, in the case in which an expansion board of the PC is used, as shown in FIG. 4, an IC chip 43 having stored in it a charging processing operation program called for by the present invention is installed as the charger 1 onto a standard type of expansion board 42 that is commercially available, and peripheral circuitry that drives and controls the IC chip 43 is also installed by performing a interconnection operation.

After the above is done, the expansion board 42 is inserted into a prescribed expansion board slot 47 provided at the rear of the PC, thereby making electrical connection to the internal power supply circuit 45 provided within the PC 10.

After the expansion board 42 is inserted into the prescribed PC location, a connection is made between the signal output terminals 21 of the expansion board 42 and a connector 23 of the holder part 3 or the stand part 6, by means of a cable 22 having an appropriate connector 15.

Although there is no restriction imposed on the construction of the holder part 3, the construction thereof is such that, as shown by the example of FIG. 4, it is possible to make a serial connection between one or a plurality of secondary cells 2 and electrodes of the holder part 3.

The construction of the holder part 3 is one whereby the holder part 3 can simultaneously accept four secondary cells 2 inserted therein, so that, for example, if it is desired to charge only one or two secondary cells, it is desirable to insert dummy batteries in the remaining insertion locations of the holder part 3.

By installing an IC memory having sufficient memory capacity for each of the secondary cells 2 used in the present invention, because the charging history of each of the secondary cells is stored, by accessing these charging histories at a later time, it is possible to obtain information with regard to the current condition of each individual secondary cell, and information with regard to about the future charging processing method and the life of each secondary cell.

In a charging system according to the present invention, in the case in which a user wishes to perform a charging operation on a secondary cell 2 of a prescribed type from a specific manufacturer, the user operates the input means 26 of the PC so as to input information with regard to the secondary cell 2 the user wishes to perform a charging operation on, thereby causing display of charging processing data with regard to this secondary cell 2 on the display means 25, whereupon the user either selects information and processing conditions for the secondary cell to be charged or directly inputs information and conditions required for a charging processing operation on the secondary cell to be charged, so that these are caused to be displayed on the display means 25, as shown by example in FIG. 9, and in the case in which the PC has not output an alarm with regard to the execution of charging processing under the selected conditions, the start key is pressed to start the charging processing with respect to the secondary cell.

An example of the contents displayed by the display means 25 of the PC during the charging processing are shown in FIG. 8.

FIG. 8 shows an example of the display at an intermediate stage in the charging processing of the secondary cell 2, the graph showing the current charging condition up to an intermediate point in the charging processing.

As is clear from the above description, a method of charging a secondary cell according to the present invention has a charger formed by a holder part configured so as to separately accept and perform a charging processing operation on one or a plurality of secondary cells of various sizes requiring charging processing or a stand part configured so as to accept and perform a charging processing operation on a plurality of secondary cells of one and the same size requiring charging processing, which are either packed in a prescribed container, forming a battery package, or to directly accept a cellular telephone apparatus within which this battery package is housed, this charger being connected to a PC, an internal power supply circuit of the PC being used as the power supply for performing a charging operation.

The PC in the present invention has built into to a charging processing operation program for charging the secondary cell.

That is, in a method for charging a secondary cell according to the present invention, the PC is configured so as to perform control of the charging current from the internal power supply circuit within the PC in accordance with the charging processing operation program, so as to execute charging processing with respect to a secondary cell requiring charging processing.

Furthermore, because it is desirable that the charging processing operation program of the present invention execute high-speed charging processing, it is preferable that the high-speed charging processing be executed at a current to achieve a charging rate of at least 2 C.

In a method for charging a secondary cell according to the present invention, the charging processing operation program is either built into the PC by inserting a floppy disk, a CD-ROM, or an IC card containing the charging processing operation program into a prescribed location of the PC, or by installing an expansion board onto which an IC chip containing the charging processing operation program into an expansion slot of the PC.

Additionally, in a method for charging a secondary cell according to the present invention, as noted above, the charging processing operation program minimally has settings for mutually different charging conditions for at least one factor, such as type, model, construction, quantity, battery capacity, and the like for each secondary cell to be subjected to charging processing, and the charging processing operation program further has a function that distinguishes at least part of the factors such as secondary cell type, model, construction, quantity, and amount of battery capacity and the like of the secondary cells requiring charging processing inserted in the holder part or the stand part, and further is capable of displaying this information.

In the same manner, in a method for charging a secondary cell according to the present invention, the configuration can be such that a user can operate an appropriate input means associated with the PC so as to input information with regard to a secondary cell requiring charging processing that is inserted into either the holder part or the stand part, and cause display of this information on a display means of the PC, and further the configuration can also be such that a user can make selection from information with regard to a secondary cell requiring charging processing various conditions required for charging of the secondary cell, this being selected from many alternatives on the display screen of the PC.

In desirable example of a method of charging a secondary cell according to the present invention, a graph of the predicted charging characteristics with regard to the charging operation conditions for a selected secondary cell requiring charging processing, and in a preferred example of a method of charging a secondary cell according to the present invention, this predicted charging characteristics graph shows the relationship of the battery voltage to the charging time, or the relationship of the battery temperature to the charging time.

Additionally, it is preferable that in a method for charging a secondary cell according to the present invention, the display means of the PC displays performs a display with regard to charging operation conditions for a selected secondary cell requiring a charging operation, such as battery model, battery capacity, charging rate, charging power supply, and the like, and a display indicating whether charging is started or in progress, and that during the charging operation of the secondary cell the display means can display the battery voltage and battery temperature of the secondary cell, which change with the elapse of charging time, or a graph showing the relationship between the battery voltage and the charging time or the battery temperature and the charging time.

Additionally, it is preferable that in the method for charging a secondary cell according to the present invention the configuration can be such that a charging processing operation program suitable charging processing of a new secondary cell is created each time a new secondary cell is introduced to the market, and that updating processing is performed to add the newly added processing to the existing charging processing operation program, for example, by distributing to a user at a fee or free of charge a floppy disk, a CD-ROM, or an IC card containing the newly updated charging processing operation program, or a expansion board onto which a chip is mounted that containing the newly updated charging processing operation program, the user being then able to update the charging processing operation program stored in his or her PC with the newly provided charging processing operation program, and an alternative method that can be used to update the charging processing operation program is that of distribution of the updated charging processing operation program to the user via a communication system such as the Internet.

Another embodiment of the present invention will be explained, hereunder.

In the above-mentioned embodiment of the present invention, although it is mainly explained that the charger, that is, a board on which a IC including a chip into which the charging process operation program is installed is mounted, is inserted into a board insertion slit and the holder portion or the battery holder means is connected to the charger through the board, the present invention is not restricted only to this embodiment.

Therefore, it is also preferable that the charger of the present invention, can be connected detachably to any one of output terminals of the internal power supply circuit of the PC, and also can be further connected either directly or indirectly, by an appropriate connector and/or cable to the battery holding apparatus.

Further, it is also preferable that the charger of the present invention, can be connected to a power supply circuit of the PC through an internationally standardized interface such as a PCI or a USB of the PC.

More over, in the present invention, in a case in which the charger is provided outside of the PC, the charger is connected to the internal power supply circuit of the PC through the board inserted into the board insertion slit or through the USB connector provided with the PC.

Note that, as shown in FIG. 12, the above-mentioned charging process can be realized by inserting the USB interface 31 provided at one end of a suitable cable 22 which is connected to a battery holder 3 in that a charging controller portion 30 including the charger 24 therein is integrally established, is inserted into a USB terminal 32 provided on a side surface of the PC.

In this embodiment, the charger can be preferably used for a secondary cell battery having a relatively small performance thereof.

On the other hand, in the present invention, by using the application software which the PC has therein, any kind of processing about this charging the battery such as the charging operation, the charging control, the identification about the secondary battery to be charged, the selection of the most suitable charging process controlling program for the identified secondary cell battery to be charged or the like, can be displayed on the display means connected to the PC with utilizing an inputting means such as a mouse or a keyboard connected to the PC.

And thus, even a person who is not so familiar with a principle of the charging processing operation, can easily understand the principle thereof and the charging operation thereof simultaneously with being educated about the charging process technology.

Therefore, an effective utilization of the secondary cell batteries is advanced so that the number of the secondary cell batteries would be thrown away will be reduced.

In the present invention, in order to install the charging operation program into the PC so as to make the display of the charging operation and the charging situation of the battery, for example, it is necessary to set several factors such as a setting for number of cell batteries to be charged, a setting of the charging rate, a setting of type of the cell battery to be charged (for example, NIMH, NICAD, or the like), a setting of name of manufacturer of the battery, a setting of battery capacitance or the like, as setting operation, and for doing these setting operation, some application software should be required.

In addition to this, as the operation, another application software for controlling the start of the charging operation, the stop of the charging operation or the like, is also required.

On the other hand, regarding the display operation, a separate application software is required which enables to display the charging amount, charging time, charging curve, charging history, temperature of the battery on the display means, for example.

Note that, in the present invention, 93, it is also preferable that the charger selected from a group consisting of an international PCI (PC interface) standard selecting from either one of a PCI board or PCI card each including the charging processing operation program therein, an IC chip mounted on an expansion board or the like, a CD-ROM, a floppy disk, an IC card each including the charging processing operation program therein and a PC hard disk (HD) onto which the charging processing operation program has been installed, is formed a kit with a predetermined battery holder means and a predetermined operation manual of the charger so as to be sold publicly.

And further, in the present invention, the kit is individually formed based upon an application to which the secondary cell battery to be charged being used, the type of the battery, the construction thereof, model thereof, respectively.

In the present invention, another aspect of the present invention can be defined as business model invention and in that, for example, the secondary cell charging system which comprising the steps of, creating a charging processing operation program used for each one of various kinds of secondary cell batteries to be charged, respectively by an business entity, storing the charging processing operation program created for each one of various kinds of secondary cell batteries to be charged, respectively, into a predetermined memory medium, opening the charging processing operation program to the public through an communication net works or by printing out same on a hard storing medium, preparing the charging processing operation program suitable for an user's intention, when the user having a PC had accessed to this system, asking the user to pay a predetermined necessary expenses through a predetermined payment system by a business entity providing the system to the public, providing the charging processing operation program to the user by distributing system or through the communication net works, when the business entity had confirmed that the user had the predetermined expenses through the predetermined payment system, installing or down loading the charging processing operation program by the user into a PC owned by the user, performing charging processing operation for a predetermined secondary cell battery by the user utilizing the charging processing operation program, and updating the charging processing operation program by the user with a new version of the charging processing operation program which would arbitrarily be down-loaded by the user.

Figure 10:
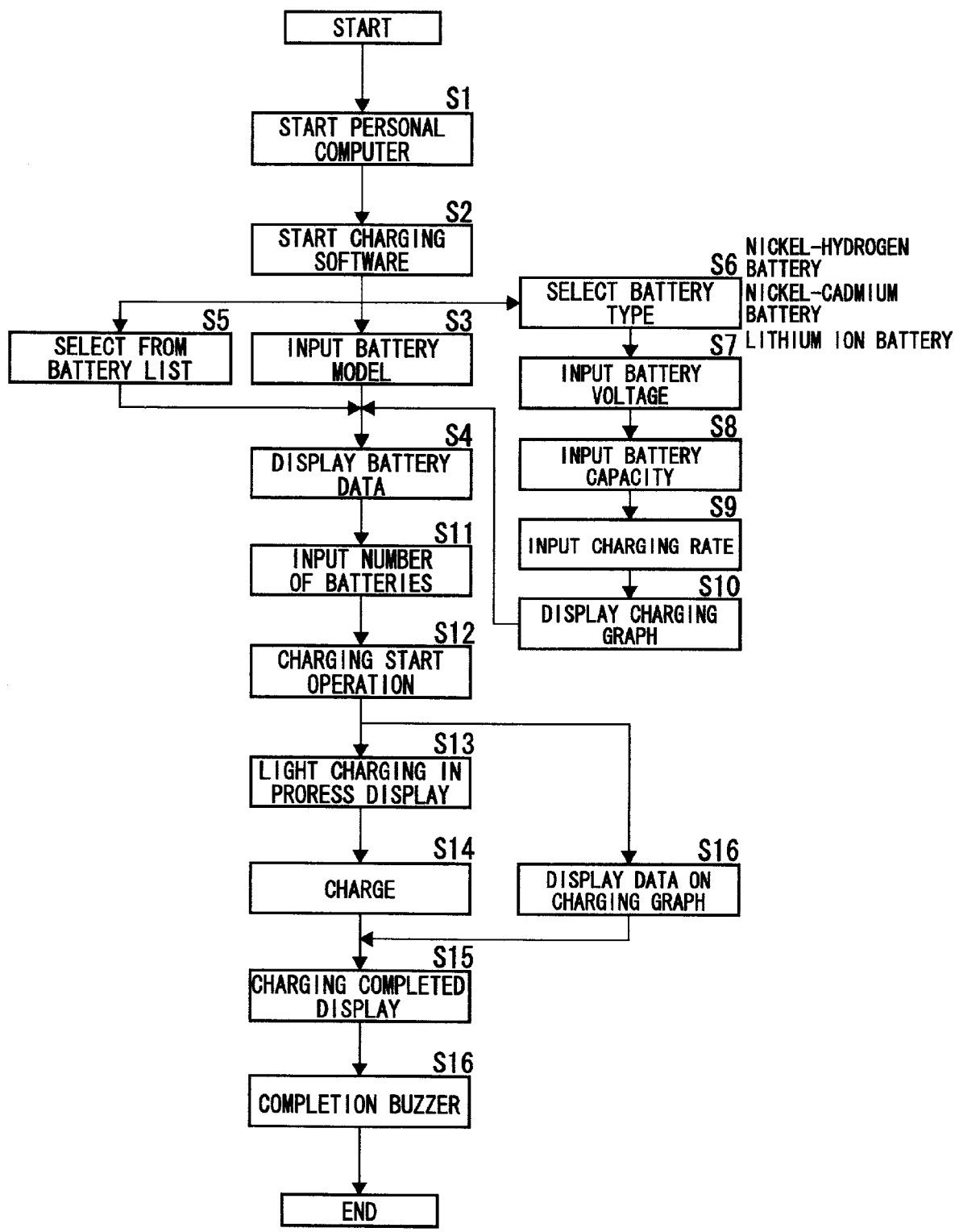
FIG. 10 is an operational flowchart showing an example of the operating procedure in a charging method according to the present invention.

An example of a method for charging a secondary cell according to the present invention is described in detail below, with reference made to the flowchart of FIG. 10.

Specifically, after starting, at step S1, after starting the PC, control proceeds to step S2, at which the charging software, including the charging processing operation program, is started.

After the above is done, in the case in which the secondary cell requiring charging processing is a classical type, or in the case in which the user is not particularly knowledgeable about secondary cell charging processing, control proceeds to step S3, at which the user inputs only the name of the manufacturer and the model of the secondary cell, after which at step S4 all battery data required for charging processing is display on the display means 25.

If the user is somewhat familiar with secondary cell charging processing operation, however, at step S5 a battery list is read from a database with regard to secondary cells, and caused to be displayed on the display means 25, whereupon the user selects a prescribed charging processing operation program from this list, after which control proceeds to step S4.

If the user is thoroughly familiar with secondary cell charging processing operation, the input means is used at step S6 to select and input the type of battery, for example, this being a nickel-hydrogen battery, a nicad battery, or a lithium ion battery or the like.

After the above, control proceeds to step S7, at which input is made of the battery voltage of the secondary cell, after which control proceeds to step S8, at which information is input with regard to the battery capacity.

After the above, control proceeds to step S9, at which the charging rate (C rate) used in the charging processing of the secondary cell is input, after which at step S10, a charging graph based on the various input results is displayed, after which return is made to step S4.

Next, the number of batteries is entered at step S11 for all the above-noted cases.

At step S12, the charging processing operation is started.

During the charging process, as indicated at step S13, a lamp or the like indicating that charging is in progress is lighted, and at step S14 the charging processing is executed.

In particular when using the routine of step S6 to step S10 in the present invention, at step S17 a graph is made that shows the charging condition of a secondary cell being currently charged, and if necessary prescribed data can be added to the charging graph.

After the above, control proceeds to step S15, at which if the charging operation has been completed, either a display means indicating that the charging is completed is caused to appear, or a light via some form of display means.

After the above-noted operation, control proceeds to step S16, at which notification is made that the charging processing operation is completed, at which point processing reaching its end.

One example of the above-noted method for charging a secondary cell according to the present invention is a method for charging a secondary cell in a charging system having a PC with an internal power supply circuit, a charger, including a charging processing operation program using the internal power supply circuit of the PC as a power supply in performing a charging operation, a display means connected to the PC, an input means connected to the PC, a controller for causing the PC including the charger, to drive, an external power supply means for driving the PC, and a battery holding apparatus connected to the charger for holding a secondary cell, this secondary cell charging method having a battery list generation step of analyzing the battery type, model, ratings, capacity, output voltage, and charging/discharging characteristics of all currently existing chargeable secondary cells, establishing the optimum charging processing operation conditions for each individual secondary cell, and generating a list thereof, a step of storing the battery list into a prescribed storage means of the PC, a step of starting software, including the charging processing operation program, a step of inserting a secondary cell requiring charging processing into the charger, a step of the charging processing operation program distinguishing information with regard to the secondary cell requiring a charging operation inserted in the charger, selecting from the battery list a charging processing operation program suitable for a charging operation of the secondary cell, and of displaying the selected charging processing operation program on the display means, together with a charging graph or other battery information, a step of displaying a charging graph, a step of inputting the number of secondary cells to be charged simultaneously, a step of verifying charging conditions on a screen of the display means, and then starting a charging operation, a step during the charging processing operation of either causing drive of an alarm means, which makes notification that a charging processing operation is in progress, or causing a dynamic display of a charging graph on the display means, and a step in the case in which the charging processing operation on the secondary cell is completed of performing a display indicating that the charging processing operation has been completed.

Another example of a method for charging according to the present invention is a method for charging a secondary cell in a charging system having a PC with an internal power supply circuit, a charger, including a charging processing operation program using the internal power supply circuit of the PC as a power supply in performing a charging operation, a display means connected to the PC, an input means connected to the PC, a controller 55 for causing the PC to drive, an external power supply means for driving the PC, and a battery holding apparatus connected to the charger for holding a secondary cell, this secondary cell charging method having a battery list generation step of analyzing the battery type, model, ratings, capacity, output voltage, and charging/discharging characteristics of all currently existing chargeable secondary cells, establishing the optimum charging processing operation conditions for each individual secondary cell, and generating a list thereof, a step of storing the battery list into a prescribed storage means of the PC, a step of starting software, including the charging processing operation program, a step of inserting a secondary cell requiring charging processing into the charger, a step of, in accordance with information with regard to a secondary cell requiring charging processing, the user selecting a charging processing operation program suitable for a secondary cell requiring a charging processing operation from the battery list a step of displaying a charging graph, a step of inputting the number of secondary cells to be charged simultaneously, a step of verifying charging conditions on a screen of the display means, and then starting a charging operation, a step during the charging processing operation of either causing drive of an alarm means, which makes notification that a charging processing operation is in progress, or causing a dynamic display of a charging graph on the display means, and a step in the case in which the charging processing operation on the secondary cell is completed of performing a display indicating that the charging processing operation has been completed.

Yet another example of a method for charging a secondary cell according to the present invention is a secondary cell charging method in a charging system having a PC with an internal power supply circuit, a charger, including a charging processing operation program using the internal power supply circuit of the PC as a power supply in performing a charging operation, a display means connected to the PC, an input means connected to the PC, a controller 55 for causing the PC to drive, and an external power supply means for driving the PC, this secondary cell charging method having a battery list generation step of analyzing the battery type, model, ratings, capacity, output voltage, and charging/discharging characteristics of all currently existing chargeable secondary cells, establishing the optimum charging processing operation conditions for each individual secondary cell, and generating a list thereof, a step of storing the battery list into a prescribed storage means of the PC, a step of starting software, including the charging processing operation program, a step of inserting a secondary cell requiring charging processing into the charger, a step of the user using the input means to input separately to the PC, a battery type, battery voltage, battery capacity, and charging rate for a secondary cell requiring charging processing, a step of the PC selecting from the battery list, based on the input information, a charging processing operation program suitable for the secondary cell requiring a charging processing operation, a step of displaying a charging graph, a step of inputting the number of secondary cells to be charged simultaneously, a step of verifying charging conditions on a screen of the display means, and then starting a charging operation, a step during the charging processing operation of either causing drive of an alarm means, which makes notification that a charging processing operation is in progress, or causing a dynamic display of a charging graph on the display means, and a step in the case in which the charging processing operation on the secondary cell is completed of performing a display indicating that the charging processing operation has been completed.

Yet another method for charging a secondary cell according to the present invention, is a charging method wherein a provider 90 of a charging processing operation program discloses optimum charging processing conditions or a charging processing operation program for a prescribed secondary cell on a web page via the Internet, so that any user can access the provider 90 of the charging processing operation program and receive distribution of the charging processing operation program via the Internet. It is desirable that the provider of a charging processing operation program discloses optimum charging processing conditions or a charging processing operation program for a prescribed secondary cell on a web page via the Internet, and that a user executes placement of an order and remittance of payment therefor via the Internet, whereupon a floppy disk, CD-ROM, IC card, or expansion board onto which is installed an IC chip containing the charging processing operation program required for execution thereof is sent to the user.

Still another method for charging a secondary cell is a charging method wherein a provider 90 of a charging processing operation program discloses optimum charging processing conditions or a charging processing operation program for a prescribed secondary cell on a web page via the Internet that are at all times the latest optimum charging processing conditions or the latest charging processing operation program, so that a user can execute placement of an order and remittance of payment therefor via the Internet, enabling the user to download the latest charging processing conditions or the latest charging processing operation program to his or her PC, thereby maintaining the latest charging processing operation environment on his or her PC.

Another example of the present invention is a storage medium onto which a program has been stored for the purpose of causing a computer to execute the various charging methods described above.

By adopting the above-described technical constitution, a charging apparatus and charging method, and other forms of the present invention provide a charging apparatus and charging method capable of reliably achieving full charging of a prescribed secondary cell using a simple apparatus and requiring only a short period of time. Additionally, by extending the life of a secondary cell, the present invention provides a charging apparatus and charging method that solve both environment and resource problems, and provide a charging apparatus and charging method that enable easy use of a home-type PC in an interactive manner to execute charging processing of a secondary cell.

Additionally, the present invention not has objects not only the enlightenment of consumers via the Internet with regard to a variety of problems that have existed from the past, but also the solution of these problems using the PC, which is at present highly available to the consumer, and the provision of an ideal charging method, thereby bringing to the consumer a great social advance.

What is claimed is:

1. A battery recharging apparatus which comprises;
  a) a charger, which is either built into a personal computer or connected directly or indirectly thereto,
    wherein an internal power supply source of said personal computer is used as a power supply for said charger in a charging operation for said battery, and
    wherein said charger includes a programmable charging processing operation program having capability for recognizing a type of rechargeable battery to be recharged and for selecting one charging processing operation program from a plurality of charging operation programs stored in said charger, based upon information about the type of battery thus recognized, said one selected charging process operation program being suitable for executing said charging operation for said recognized type of battery and for setting and executing said selected program, and for monitoring conditions required for charging said recognized battery type, and for controlling recharging of said recognized battery, and
    wherein a charging operation may be performed by executing said charging processing operation program selected for said selected battery to be charged by utilizing an electric power supplied from said internal power supply source of said personal computer;
  b) a battery holding apparatus which holds at least a single battery to be charged and connected directly or indirectly to said charger;
  c) a display means connected to said personal computer and displaying at least one information selected from a group consisting of information related to a battery to be charged, information related to conditions required for charging said battery to be charged and information related to past and current charging situation or results of said charging operation; and
  d) an input means connected to said personal computer for inputting information at least about said respective battery to be charged necessary to execute said charging processing operation program into a controller provided in personal computer;
    wherein said battery charging processing operation program is capable of executing high-speed charging processing, and further wherein said battery charging processing operation program is capable of executing said charging with a charging current of at least 2 C.

2. A rechargeable battery charging apparatus according to claim 1, wherein each one of a plurality of said charging processing operation programs is created so as to have a respective charging process operation condition of a rechargeable battery to be subjected to charging processing, being different from each other based upon at least one factor among a rechargeable battery manufacturer name, rechargeable battery type, model, construction, quantity, battery capacity, and internal resistance and the like.

3. A rechargeable battery charging apparatus according to claim 1, wherein said charging processing operation program has a function to distinguish at least one information selected from a group of information consisting a manufacturer name, rechargeable battery type, model, construction, quantity, battery capacity, and internal resistance and the like of a rechargeable battery requiring charging processing inserted in said battery holding apparatus.

4. A rechargeable battery charging apparatus according to claim 1, wherein said charger automatically selects a charging processing operation program having the most suitable charging processing condition to said rechargeable battery to be charged, among a plurality of charging processing operation programs stored in said charger utilizing information about the rechargeable battery to be charged and distinguished by said personal computer, its-self or separate information about the rechargeable battery to be charged which is input into said personal computer by a user utilizing said inputting means.

5. A rechargeable battery charging apparatus according to claim 1 wherein information regarding a rechargeable battery requiring charging processing and inserted into said battery holding apparatus is displayed on a display means of said personal computer.

6. A rechargeable battery charging apparatus according to claim 5, wherein a user uses an appropriate input means associated with said personal computer to input information regarding a rechargeable battery requiring charging processing inserted in said battery holding apparatus, said information being displayed on a display means of said personal computer.

7. A rechargeable battery charging apparatus according to claim 6, wherein when a user uses an appropriate input means associated with said personal computer to input information regarding a rechargeable battery requiring charging processing inserted in said battery holding apparatus and display said information on said display means of said personal computer in a case in which at least one information being different from information regarding a rechargeable battery requiring charging processing inserted in said battery holding apparatus is input, an alarm means is driven.

8. A rechargeable battery charging apparatus according to claim 6, wherein a user, based on information regarding a rechargeable battery requiring charging processing, sets various conditions necessary to be required for charging said rechargeable battery by selecting same from a large number of alternatives displayed on a display screen of said personal computer.

9. A rechargeable battery charging apparatus according to claim 1, wherein a predicted charging characteristics graph with regard to charging operation conditions for said selected rechargeable battery requiring charging processing can be displayed on said display means of said personal computer.

10. A rechargeable battery charging apparatus according to claim 9, wherein said predicted charging characteristics graph indicates a relationship between a battery voltage and a charging time or a relationship between a battery temperature and a charging time.

11. A rechargeable battery charging apparatus according to claim 5, wherein a display means of said personal computer displays at least one information selected from a manufacturer name, a battery type, battery capacity, charging rate, and internal resistance and the like with regard to charging operation conditions for said selected rechargeable battery whether it distinguishes the start of charging or charging in progress.

12. A battery recharging apparatus which comprises;
a) a charger, which is either built into a personal computer or connected directly or indirectly thereto, whereby an internal power supply source of said personal computer is used as a power supply for said charger in a charging operation for said rechargeable battery, and wherein said charger includes a charging processing operation program having capability for recognizing a type of rechargeable battery to be recharged and for selecting one charging processing operation program from a plurality of charging operation programs stored in said charger, based upon information about the type of battery thus recognized, said one selected charging process operation program being suitable for executing said charging operation for said recognized type of battery and for setting and executing said selected program, and for monitoring conditions required for charging said recognized battery type, and for controlling recharging of said recognized battery, and
wherein a charging operation may be performed by executing said charging processing operation program selected for said selected battery to be charged by utilizing an electric power supplied from said internal power supply source of said personal computer;
b) a battery holding apparatus which holds at least single battery to be charged and connected directly or indirectly to said charger;
c) a display means connected to said personal computer and displaying at least one information selected from a group consisting of information related to a battery to be charged, information related to conditions required for charging said battery to be charged and information related to past and current charging situation or results of said charging operation; and
d) an input means connected to said personal computer and for inputting information at least about said respective battery to be charged necessary to execute said charging processing operation program into a controller provided in personal computer; and
further wherein, said display means of said personal computer displays at least one information selected from a manufacturer name, a battery type, battery capacity, charging rate, and internal resistance and the like with regard to charging operation conditions for said selected rechargeable battery requiring charging processing, and separately displays either one of the start of charging or charging in progress and wherein said display means displays either a separate display of a battery voltage and battery temperature, which vary with the elapse of processing time, or a graph indicating a relationship between a battery voltage and a charging time or a relationship between a battery temperature and a charging time, further wherein, said charging processing operation program has separate settings of charging processing conditions for all rechargeable battery currently existing to be subjected to charging processing, respectively and further wherein said charging processing operation program is created that is suitable for charging processing of a new rechargeable battery each time a new rechargeable battery is marketed, said program being added to an existing charging processing operation program by updating processing.

13. A charging system for recharging a battery, comprising:
a) a personal computer comprising an internal power supply circuit;
b) a charger using said internal power supply circuit of said personal computer as a power supply for said charger in a charging operation and which is provided with a charging processing operation program suitable for performing a charging operation for charging a respective battery to be charged, said charger having capability for recognizing a type of rechargeable battery to be recharged and for selecting one charging processing operation program from a plurality of charging operation programs stored in said charger, based upon information about the type of battery thus recognized, said one selected charging process operation program being suitable for executing said charging operation for said recognized type of battery and for setting and executing said selected program, and for monitoring conditions required for charging said recognized battery type, and for controlling recharging of said recognized battery, and;

c) a display means connected to said personal computer and displaying at least one information selected from a group consisting of information related to a battery to be charged, information related to conditions required for charging said battery to be charged and information related to past and current charging situation or results of said charging operation; and d) a controller for causing said personal computer to drive;

e) a battery holding apparatus which holds at least single rechargeable battery to be charged and connected to said charger;

f) an input means connected to said personal computer and for inputting information at least about said respective rechargeable battery to be charged necessary to execute said charging processing operation program into said controller of said personal computer; and g) an external power supply means for driving said personal computer, and wherein said system further comprises a battery holding apparatus connected directly or indirectly to said charger, said battery holding apparatus including either a holder part configured so as to enable acceptance and a charging processing operation separately on one or a plurality of rechargeable battery of various sizes requiring charging processing, or a stand part configured so as to enable acceptance and a charging processing operation of a plurality of rechargeable battery to be charged of the same size packaged within a prescribed pack, or directly of a cellular telephone with said pack built thereinto, wherein, said charging processing operation program either built into said personal computer or stored in said charger externally connected to personal computer performs high-speed charging processing, and further wherein, said rechargeable battery charging processing operation program executes charging with a charging current of at least 2 C.

14. A charging system according to claim 13, wherein said charger is connected detachably to any one of output terminals of said internal power supply circuit of said personal computer, and is further connected either directly or indirectly, by an appropriate connector and/or cable to said battery holding apparatus.

15. A charging system according to claim 13, wherein said charger is connected to said power supply circuit of said personal computer through an internationally standardized interface such as a PCI or a USB of said personal computer.

16. A charging system according to claim 13, wherein each of said charging processing operation program has mutually different charging processing conditions from each other as set for at least one factor among a rechargeable battery manufacturer name, rechargeable battery type, model, construction, quantity, battery capacity, and internal resistance and the like of a rechargeable battery to be subjected to charging processing.

17. A charging system according to claim 13, wherein said charging processing operation program has a function to distinguish at least one information selected from a group of information consisting of a manufacturer name, rechargeable battery type, model, construction, quantity, battery capacity, and internal resistance and the like of a rechargeable battery requiring charging processing inserted in said battery holding apparatus, and further wherein said program having a function in that said distinguished information about said rechargeable battery is displayed on said display means.

18. A charging system according to claim 13, wherein said input means is used to display on said display means information regarding a rechargeable battery requiring charging processing inserted into said battery holding apparatus.

19. A charging system according to claim 13, wherein, from information regarding said rechargeable battery requiring charging processing recognized by said personal computer, or from information regarding said rechargeable battery requiring charging processing input by a user via said input means, a charging processing operation program having charging processing conditions most suited for said rechargeable battery required charging processing is selected from a plurality of charging processing operation programs stored within said charger.

20. A charging system according to claim 13, wherein either various information regarding optimum charging operation conditions for a selected rechargeable battery requiring charging processing or a predicted charging characteristics graph with regard to charging operation conditions for said selected rechargeable battery requiring charging processing can be displayed on said display means of said personal computer.

21. A charging system according to claim 17, wherein said input means is used to display on said display means information regarding a rechargeable battery requiring charging processing inserted into said battery holding apparatus, further wherein, various conditions necessary to be required for charging said rechargeable battery by selecting same from a large number of alternatives displayed on a display screen of said personal computer can be set by a user, based on information regarding a rechargeable battery requiring charging processing, and further wherein, from information regarding said rechargeable battery requiring charging processing recognized by said personal computer, or from information regarding said rechargeable battery requiring charging processing input by a user via said input means, a charging processing operation program having charging processing conditions most suited for said rechargeable battery required charging processing is selected from a plurality of charging processing operation programs stored within said charger, and further wherein, either various information regarding optimum charging operation conditions for a selected rechargeable battery requiring charging processing or a predicted charging characteristics graph with regard to charging operation conditions for said selected rechargeable battery requiring charging processing can be displayed on said display means of said personal computer, and further wherein, aid predicted charging characteristics graph indicates a relationship between a battery voltage and a charging time or a relationship between a battery temperature and a charging time.

22. A charging system according to claim 21, wherein a display means of said personal computer displays a battery type, battery capacity, charging rate, and internal resistance and the like with regard to charging operation conditions for said selected rechargeable battery requiring charging processing, and displays whether it distinguishes the start of charging or charging in progress, and further displays during said charging operation on said rechargeable battery either a separate display of a battery voltage and battery temperature, which vary with the elapse of processing time, or a graph indicating a relationship between a battery voltage and a charging time or a relationship between a battery temperature and a charging time.

23. A charging system according to claim 21, wherein a notification means is provided which, after a start of a prescribed charging processing operation under selected charging conditions with respect to a selected rechargeable battery requiring charging processing, in a case in which said charging operation is completed, makes notification to a user of said completion.

24. A charging system according to claim 21, wherein said charging processing operation program has a separate settings of charging processing conditions for all rechargeable battery currently existing to be subjected to charging processing, respectively.

25. A charging system according to claim 21, wherein said charging processing operation program is created that is suitable for charging processing of a new rechargeable battery each time a new rechargeable battery is marketed, said program being added to an existing charging processing operation program by updating processing.

\* \* \* \* \*